US012727666B2

(12) United States Patent
Cameron et al.

(10) Patent No.: US 12,727,666 B2
(45) Date of Patent: Sep. 8, 2026

(54) CABLE MANAGEMENT APPARATUS AND METHOD

(71) Applicant: Humanscale Corporation, New York, NY (US)

(72) Inventors: Brian Cameron, West Islip, NY (US); Kingyu Li, Milburn, NJ (US); Ross Velazquez, Brooklyn, NY (US); G. Justin Meeks, Willow Spring, NC (US)

(73) Assignee: Humanscale Corporation, New York, NY (US)

(*) Notice: Subject to any disclaimer, the term of this patent is extended or adjusted under 35 U.S.C. 154(b) by 0 days.

(21) Appl. No.: 18/607,006

(22) Filed: Mar. 15, 2024

(65) Prior Publication Data

US 2024/0306809 A1 Sep. 19, 2024

Related U.S. Application Data

(60) Provisional application No. 63/452,970, filed on Mar. 17, 2023.

(51) Int. Cl.

| | |
|---|---|
| ***A47B 21/06*** | (2006.01) |
| ***A47B 9/20*** | (2006.01) |
| ***H01B 7/06*** | (2006.01) |
| ***H01R 25/00*** | (2006.01) |

(52) U.S. Cl.

CPC ................ *A47B 21/06* (2013.01); *A47B 9/20* (2013.01); *H01B 7/065* (2013.01); *H01R 25/006* (2013.01); *A47B 2021/066* (2013.01)

(58) Field of Classification Search

CPC ..... A47B 21/06; A47B 9/20; A47B 2021/066; A47B 2200/0082; H01B 7/065; H01R 25/006

See application file for complete search history.

(56) References Cited

U.S. PATENT DOCUMENTS

| | | | | |
|---|---|---|---|---|
| 6,490,981 | B2 * | 12/2002 | Isensee | A47B 96/14 108/50.02 |
| 9,655,438 | B1 * | 5/2017 | Shoenfeld | A47B 21/02 |
| 9,675,170 | B2 * | 6/2017 | Klinke | A47B 9/04 |

(Continued)

FOREIGN PATENT DOCUMENTS

| | | | | |
|---|---|---|---|---|
| AU | 2014236874 A1 | * 10/2015 | | A47B 9/04 |
| CN | 205658582 U | * 10/2016 | | A47B 21/02 |

(Continued)

OTHER PUBLICATIONS

PCT Application No. US24/20253; International Search Report and Written Opinion of the International Searching Authority for Applicant Humanscale Corporation dated Jul. 10, 2024.

(Continued)

*Primary Examiner* — Hanh V Tran

(74) *Attorney, Agent, or Firm* — Jones Walker LLP

(57) ABSTRACT

An apparatus and method for cable management. The apparatus may include a cap assembly for attaching the apparatus to a work surface where a user desires to raise power and/or data connections vertically up to the work surface. The apparatus may further include a dynamic leg assembly for adjusting a height of the apparatus. Once installed, a user may raise or lower the work surface, thereby increasing or decreasing a height of the apparatus and its power and/or data connections.

16 Claims, 12 Drawing Sheets

(56) References Cited

U.S. PATENT DOCUMENTS

| | | | | | |
|---|---|---|---|---|---|
| 9,723,920 | B1 * | 8/2017 | Wu | H02K 7/06 |
| 10,381,808 | B2 * | 8/2019 | Byrne | H02B 1/06 |
| 10,514,126 | B2 * | 12/2019 | Asante | A47B 21/04 |
| 10,851,938 | B2 * | 12/2020 | Glickstein | F16M 11/16 |
| 10,856,652 | B2 * | 12/2020 | Stanek | A47B 21/06 |
| 10,959,514 | B2 * | 3/2021 | Klinke | A47B 9/00 |
| 11,432,645 | B2 * | 9/2022 | Lucci | A47B 13/021 |
| 2011/0168035 | A1 * | 7/2011 | Saunders | A47J 39/02<br>99/537 |
| 2017/0071332 | A1 * | 3/2017 | Herring | A47B 21/02 |
| 2021/0106133 | A1 * | 4/2021 | Anderson | A47B 9/20 |
| 2021/0307504 | A1 | 10/2021 | Lucci | |

FOREIGN PATENT DOCUMENTS

| | | | | | |
|---|---|---|---|---|---|
| CN | 107752376 | A | * | 3/2018 | A47B 21/06 |
| CN | 111387712 | A | * | 7/2020 | A47B 91/06 |
| DE | 202010014127 | U1 | * | 3/2012 | A47B 9/14 |
| JP | 2020065753 | A | * | 4/2020 | A47B 96/00 |
| WO | WO-2016175241 | A1 | * | 11/2016 | A47B 83/001 |

OTHER PUBLICATIONS

Humanscale Corporation, Neatup 1.0 Installation Manual, Oct. 7, 2022, 2 pages.

Humanscale Corporation, Neatup 1.0 Product Brochure, 2021, 3 pages.

* cited by examiner

CABLE MANAGEMENT APPARATUS AND METHOD

RELATED APPLICATION(S)

This application claims the priority benefit under USC § 119 to U.S. Provisional Application No. 63/452,970, filed on Mar. 17, 2023, which is incorporated by reference herein in its entirety.

BACKGROUND OF THE INVENTION

The disclosure relates to an apparatus for cable management. The disclosure also relates to a method of managing cables. It is a challenge of existing cable management systems to offer cable management solutions that can be universally applied to work surfaces of varying heights and structural design. Existing cable management systems also offer limited solutions for data connectivity.

SUMMARY OF THE INVENTION

The disclosure relates to a cable management apparatus that, amongst other benefits, provides for increased interchangeability across different work surface heights and designs, and an option for data connectivity.

In one embodiment, the apparatus may comprise a cap assembly, wherein the cap assembly comprises one or more upper cable apertures. The apparatus may comprise an adjustable leg assembly secured to the cap assembly. The leg assembly may comprise a lower segment and two or more telescoping segments positioned between the lower segment and the cap assembly. The lower segment may include one or more lower cable apertures.

In another embodiment, the apparatus may further comprise a power strip cord having a first end and a second end, wherein the first end passes through the upper cable aperture, wherein the second end passes through the lower cable aperture. The power strip cord may further comprise a middle coiled portion between the first and second ends. The middle coiled portion may be configured to expand and contract upon lengthening and shortening of the cable management apparatus, respectively.

In another embodiment, the telescoping segments may be configured to increase or decrease a height of the cap assembly relative to the one or more lower cable apertures. The height may range from about 482 mm to about 1302 mm.

In another embodiment, the two or more telescoping segments may comprise a groove configured to allow the one or more lower cable apertures to remain unobstructed by the two or more telescoping segments.

In another embodiment, the cap assembly may further comprise a mounting stem and a releasable mounting socket. The releasable mounting socket may be configured to connectively engage the mounting stem. The mounting stem may comprise a ring indentation. The releasable mounting socket may be configured to engage the ring indentation. The cap assembly may further comprise a release catch configured to disengage the releasable mounting socket from the mounting stem. The release catch may comprise a push button configured to release the mounting stem upon depressing of the push button.

In another embodiment, the cap assembly may be configured to be releasably coupled to a work surface.

In yet another embodiment, the apparatus may comprise a cap assembly, wherein the cap assembly comprises one or more upper data ports. The apparatus may comprise an adjustable leg assembly secured to the cap assembly. The leg assembly may comprise a lower segment and two or more telescoping segments positioned between the lower segment and the cap assembly. The lower segment may include one or more lower data ports corresponding to the one or more upper data ports. The one or more upper data ports may be chosen from the group consisting of a USB port, a USB-C port, an Ethernet port, an HDMI port, a DVI port, and a display port, wherein the one or more lower data ports corresponds to the one or more upper data ports.

In another embodiment, the cap assembly may further comprise one or more coiled data cables flowing between the one or more upper data ports and the one or more lower data ports. The coiled data cable may be configured to expand and contract upon lengthening and shortening of the cable management apparatus, respectively.

In another embodiment, the telescoping segments may be configured to increase or decrease a height of the cap assembly relative to the one or more lower data ports. The height may range from about 482 mm to about 1302 mm.

In another embodiment, the two or more telescoping segments may comprise a groove configured to allow the one or more lower data ports to remain unobstructed by the two or more telescoping segments.

In another embodiment, the cap assembly may further comprise a mounting stem and a releasable mounting socket. The releasable mounting socket may be configured to connectively engage the mounting stem. The mounting stem may comprise a ring indentation. The releasable mounting socket may be configured to engage the ring indentation. The cap assembly may further comprise a release catch configured to disengage the releasable mounting socket from the mounting stem. The release catch may comprise a push button configured to release the mounting stem upon depressing of the push button.

In another embodiment, the cap assembly may be configured to be releasably coupled to a work surface.

The disclosure also relates to a method of managing cables.

The method may include the step of securing a cable management apparatus to a work surface. The cable management apparatus may comprise a cap assembly and a leg assembly; wherein the cap assembly comprises a mounting section and one or more upper cable apertures; wherein the leg assembly comprises a lower segment, two or more telescoping segments positioned between the lower segment and the cap assembly, and one or more power strip cords, wherein the lower segment includes one or more lower cable apertures, wherein the one or more power strip cords passes through the one or more upper cable apertures and the one or more lower cable apertures. The method may include the step of adjusting a vertical height of the work surface and the cable management apparatus.

In another embodiment, the method may include the step of securing a cable management apparatus to a work surface. The cable management apparatus may comprise a cap assembly and a leg assembly; wherein the cap assembly comprises a mounting section and one or more upper data ports; wherein the leg assembly comprises a lower segment, two or more telescoping segments positioned between the lower segment and the cap assembly; one or more lower data ports corresponding to the one or more upper data ports; and one or more data cords between the one or more upper data ports and the one or more lower data ports. The method may include the step of adjusting a vertical height of the work surface and the cable management apparatus.

BRIEF DESCRIPTION OF DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention.

DETAILED DESCRIPTION OF THE INVENTION

Figure 1A:
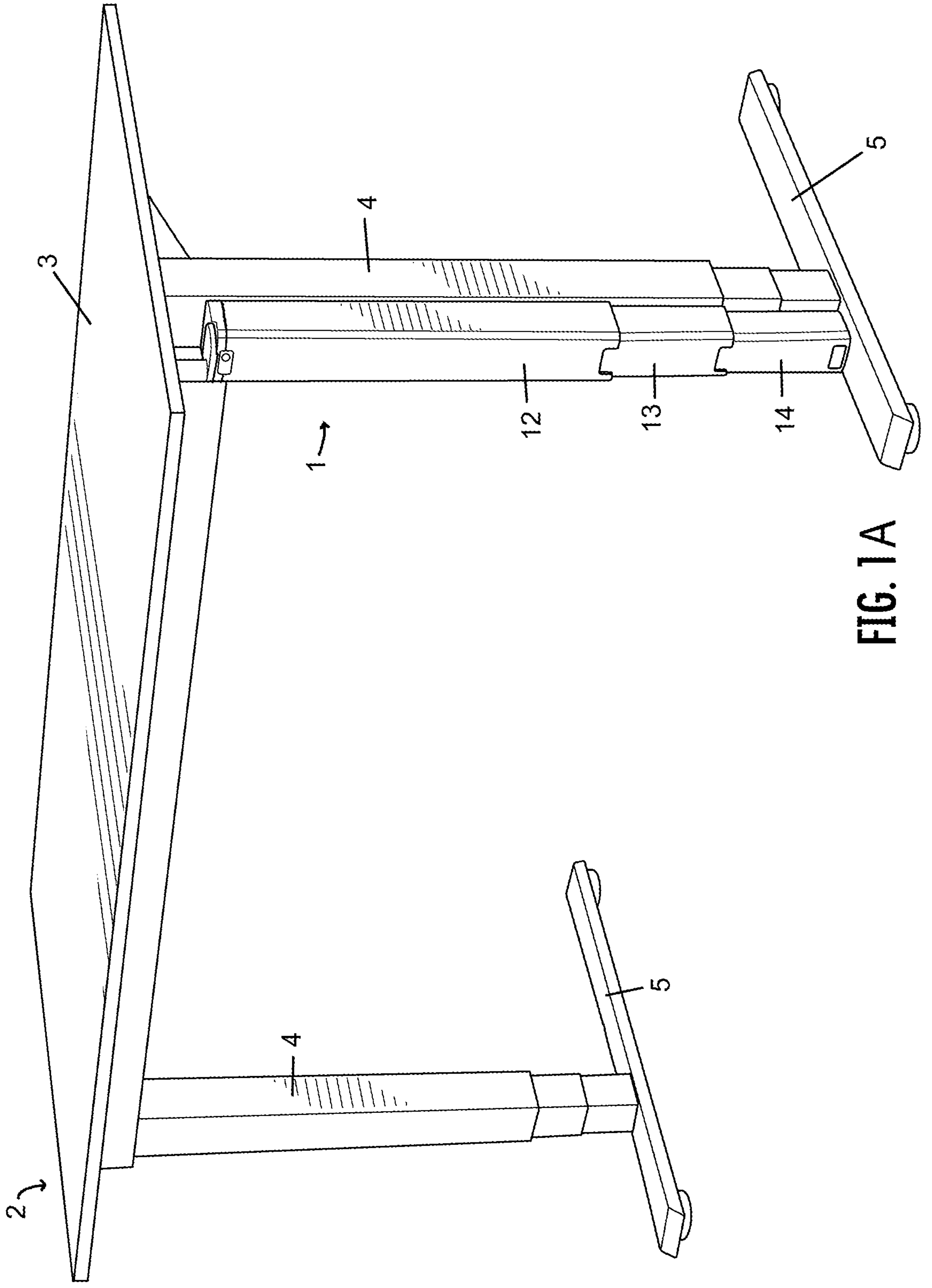
FIG. 1A is a front perspective view of an exemplary embodiment of a cable management apparatus of the present invention.

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more. The term "plurality," as used herein, is defined as two or more. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, upper and lower, top and bottom, right and left, and the like may be used solely to distinguish one entity or action from another entity or action without necessarily requiring or implying any actual such relationship or order between such entities or actions.

Figure 1B:
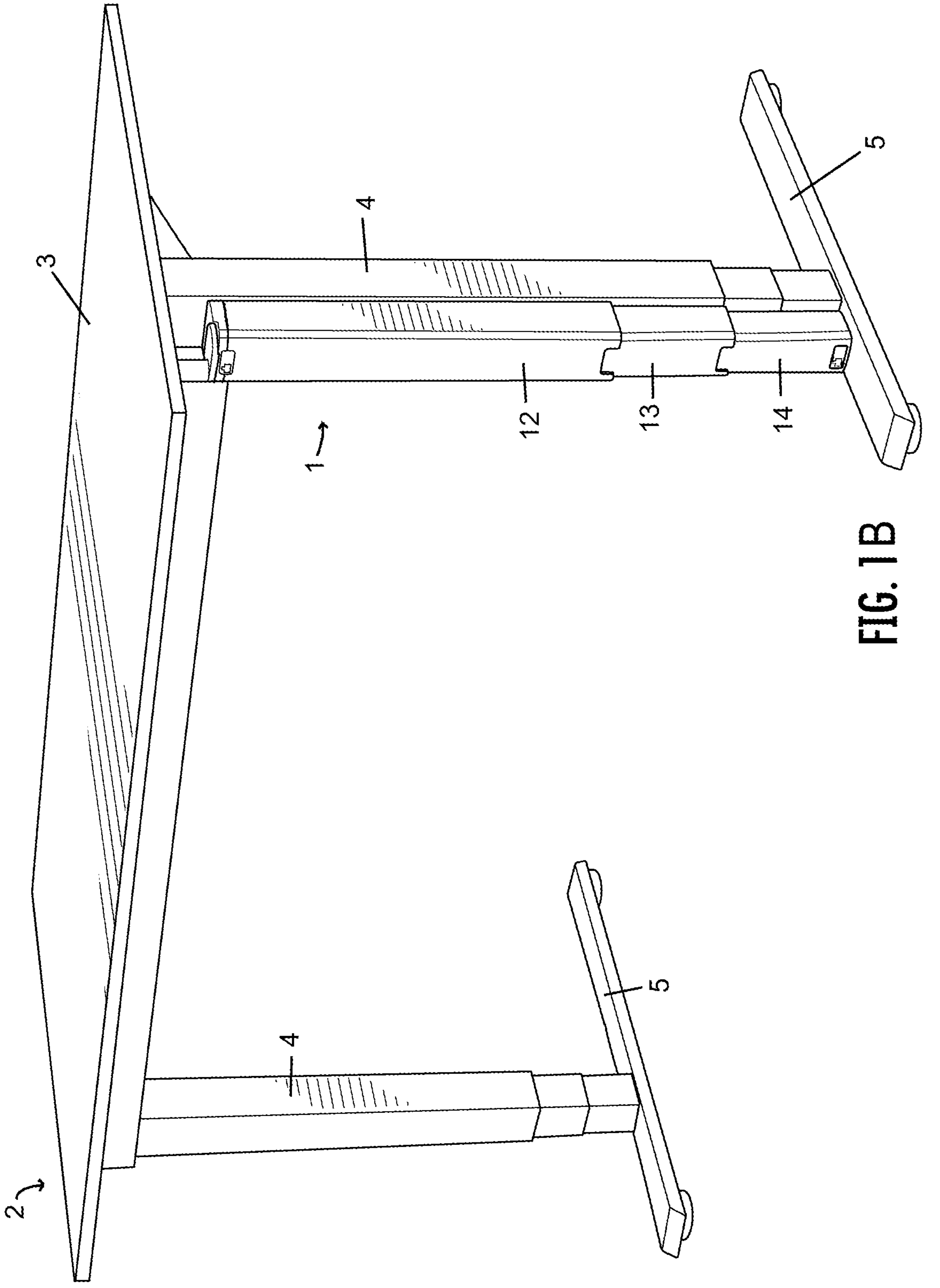
FIG. 1B is a front perspective view of another exemplary embodiment of a cable management apparatus of the present invention.

Described now are exemplary embodiments of the present invention. Referring to FIGS. 1A-1B, an exemplary embodiment of a cable management apparatus 1 of the present invention is shown. The cable management apparatus 1 may be attached to a table 2. The table 2 can take on a variety of forms. In some embodiments, the table 2 may be a stationary table. In other embodiments, the table 2 may be a height-adjustable table. For example, the cable management apparatus 1 may be attached to the height-adjustable table described in U.S. Pat. No. 9,038,549 B1. In the embodiment depicted in FIGS. 1A-1B, the table 2 may be a height-adjustable desk with a work surface 3, one or more height-adjustable legs 4, and one or more feet 5. A skilled artisan will recognize that the cable management apparatus 1 can be alternatively configured to be mounted to any table or work surface where a user desires to raise the position of power and/or cable connections vertically.

The height-adjustable table 2 depicted in FIGS. 1A-1B allows a user to select a desired vertical height of the work surface 3. The user may select a shorter height such that, for instance, the user may sit in a chair while utilizing the work surface 3. The user may alternatively select a taller height such that the user may stand while utilizing the work surface 3. Typical cable management systems are not configured to adjust to the varying heights of height-adjustable tables; thus, a cable management apparatus configured to adapt to a multitude of heights is needed and described herein.

Figure 2:
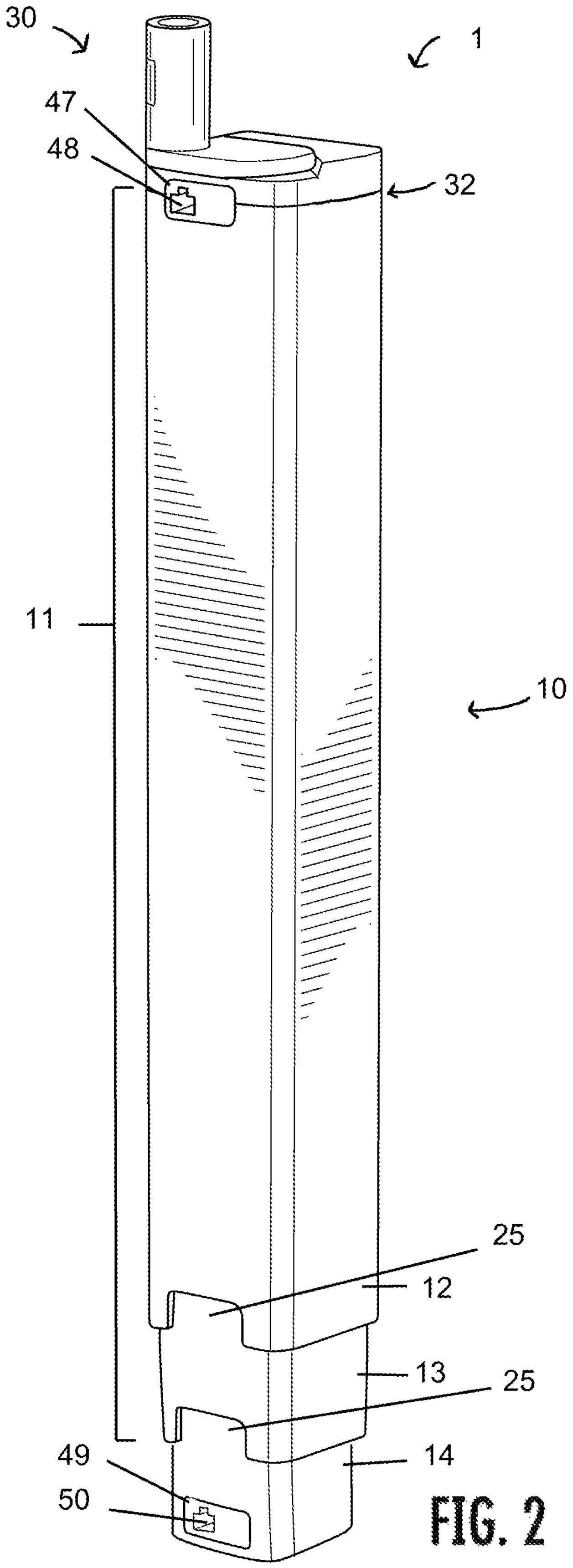
FIG. 2 is a front perspective view of the cable management apparatus shown in FIG. 1B.

In the exemplary embodiment depicted in FIG. 2, the cable management apparatus 1 may comprise an adjustable leg assembly 10 coupled to a cap assembly 30. The leg assembly 10 may be fixedly attached to cap assembly 30. The attachment mechanism may take on a variety of forms. For example, leg assembly 10 may be fixedly attached to cap assembly 30 via an interlocking snap system. Leg assembly 10 may also be fixedly attached to cap assembly 30 via screws.

As depicted in FIG. 2, the adjustable leg assembly 10 is dynamic. The dynamic leg assembly allows a user to optimize the vertical length of the leg assembly 10, thus providing the cable management apparatus 1 a wide range of height adjustability between, for example, about 482 mm to about 1302 mm. The adjustable leg assembly 10 may comprise a telescoping portion 11 and a lower segment 14. The telescoping portion 11 may comprise two telescoping segments, namely, a first telescoping segment 12 and a second telescoping segment 13. In alternative embodiments, the telescoping portion 11 may include a single telescoping segment. In further alternative embodiments, the telescoping portion 11 may include three or more telescoping segments.

Figure 3A:
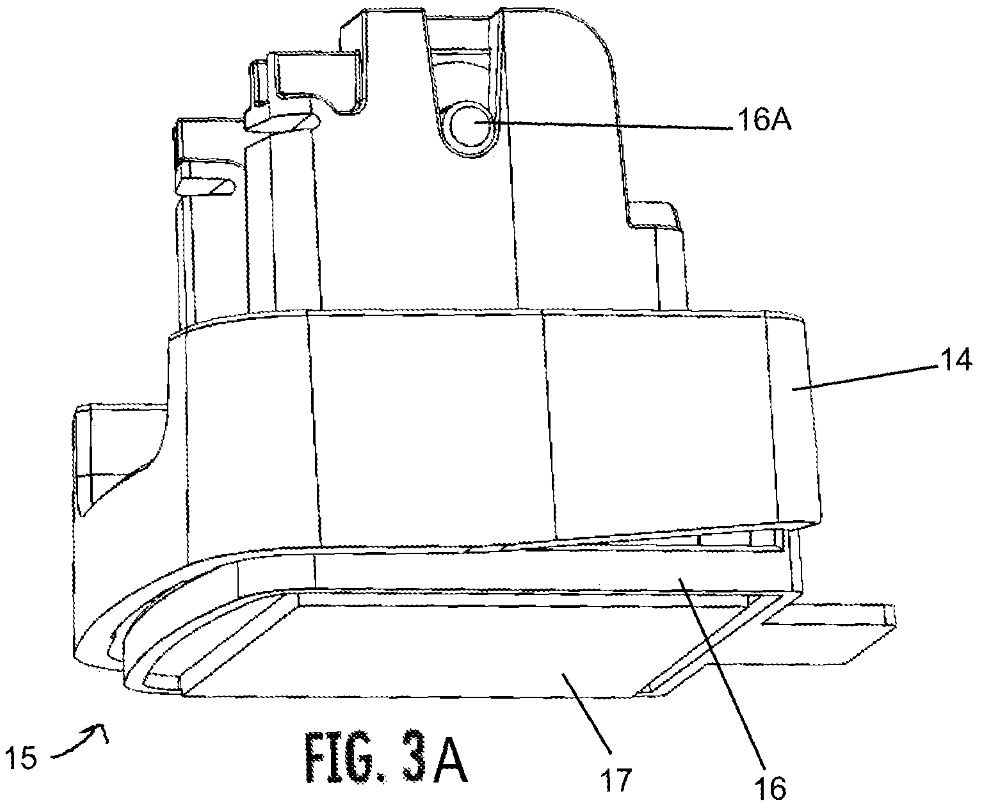
FIG. 3A is a side perspective view of a foot subassembly.
Figure 3B:
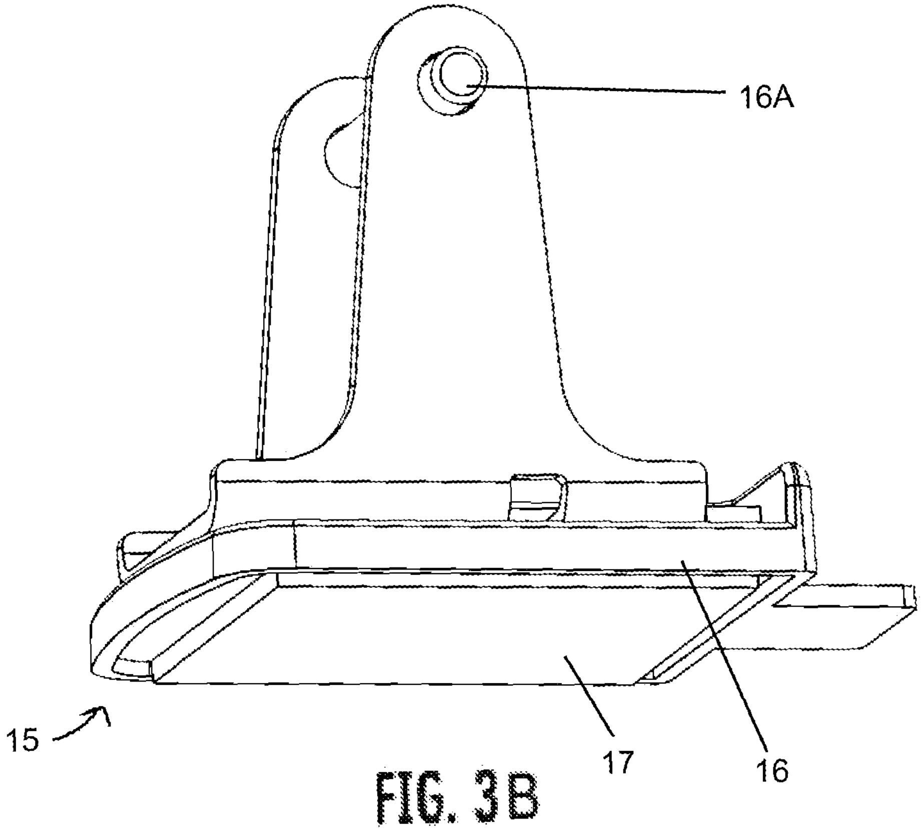
FIG. 3B is a side perspective view of a bracket of the foot subassembly shown in FIG. 3A.

As shown in FIGS. 3A-3B, the lower segment 14 may include a foot subassembly 15. The foot subassembly 15 may include a bracket 16. The bracket 16 may attach the cable management apparatus 1 to any variety of table, work surface, or floor. In one embodiment, the bracket 16, such as a metal bracket, may be fixedly attached to the feet 5 of the table 2 shown in FIGS. 1A-1B. Referring back to FIGS. 3A-3B, the bracket 16 may be pivotable so as to allow the bracket 16 to attach to a table foot with a sloped surface. For example, the bracket 16 may pivot up to 5 degrees to accommodate a table foot with a sloped surface. The bracket may pivot about a rod 16A, which may be configured to connect the bracket 16 to the lower segment 14.

The foot subassembly 15 may further include an adhesive pad 17 for the purpose of fixedly attaching the foot subassembly 15 to, for example, the feet 5 of the table 2 shown in FIGS. 1A-1B. A skilled artisan will recognize that the attachment mechanism by which the bracket 16 attaches to the feet 5 of table 2 may take on a variety of forms. For example, the bracket 16 may alternatively be attached to the feet of the table via screws.

Figure 4:
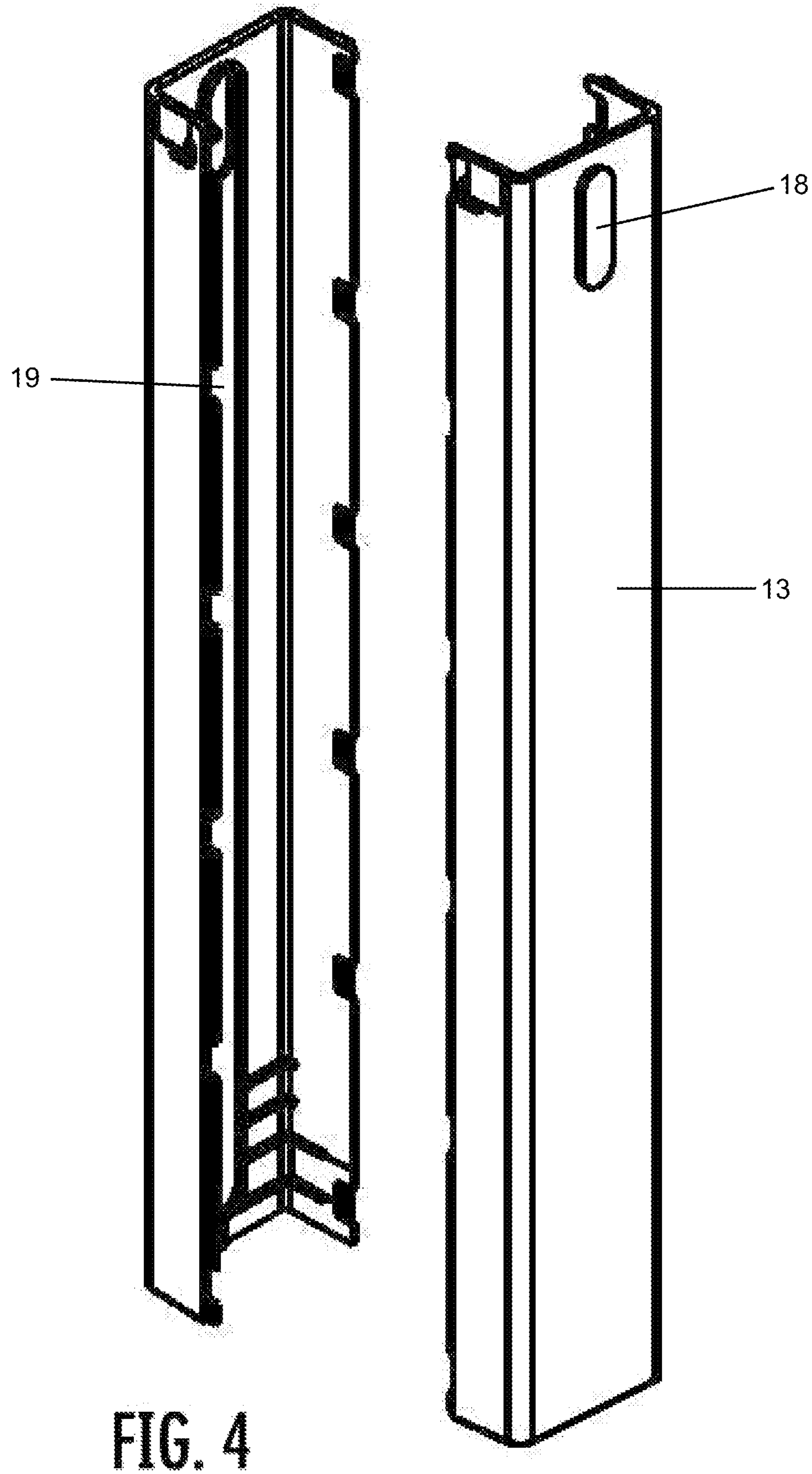
FIG. 4 is a side perspective view of a telescoping segment.

Now referring to FIG. 4, the telescoping and lower segments may engage one another via a track-and-protrusion system. This track-and-protrusion system provides the mechanism by which the telescoping and lower segments extend and contract, while furthering the stability of the dynamic leg assembly as a whole as it moves. A track protrusion and track are typically included at every point where a telescoping segment meets another telescoping segment or a lower segment. In the specific embodiments described herein, the first telescoping segment 12 may include a track but no protrusion. The second telescoping segment 13 may include a track protrusion 18 and a track 19, as is shown in FIG. 4. The lower segment 14 may include a protrusion but no track. In some embodiments, the track protrusion 18 may be an oval boss protrusion, and the track 19 may be an oval track. In the embodiment depicted in FIG. 4, the track protrusion 18 may be located on an outer surface of the second telescoping segment 13, and the track may be located on an inner surface of the second telescoping segment 13.

Referring back to FIGS. 1A-1B, as the first telescoping segment 12 rises with the work surface 3, the track protrusion of the second telescoping segment 13 may move along the track of the first telescoping segment 12. The engagement of the track protrusion with the track provides stability between the segments such that the first telescoping segment 12 remains aligned with the second telescoping segment 13 as the first telescoping segment 12 rises. When the track protrusion of the second telescoping segment 13 reaches the end of the track of first telescoping segment 12, the second telescoping segment 13 may begin to rise with the first telescoping segment 12. The second telescoping segment 13 may engage the lower segment 14 via another track protrusion and track such that the second telescoping segment 13 may remain aligned with the lower segment 14 as the second telescoping segment 13 rises. In some embodiments, the adjustable leg assembly 10 may have additional track protrusions and tracks. For example, each segment may have two sets of track protrusions and tracks. The number of track protrusions and tracks may also depend on the number of telescoping segments.

Figure 5A:
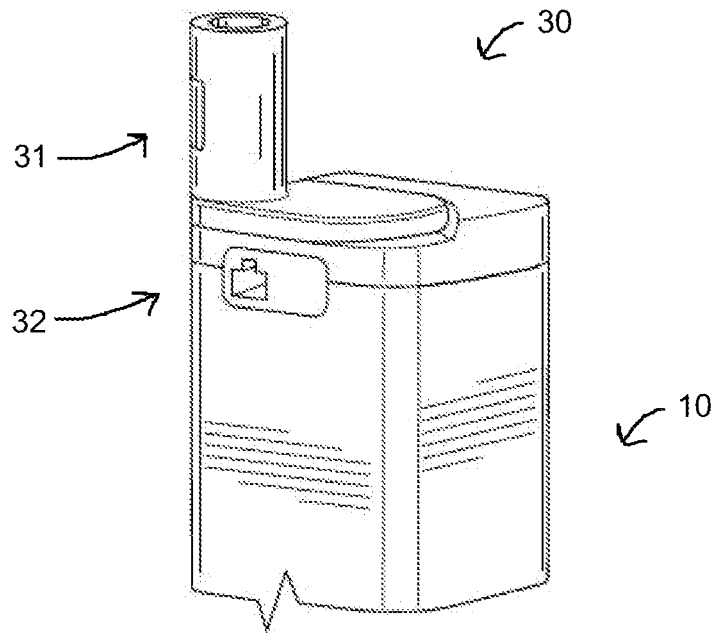
FIG. 5A is a front perspective view of a cap assembly of the embodiment shown in FIG. 1B.
Figure 5B:
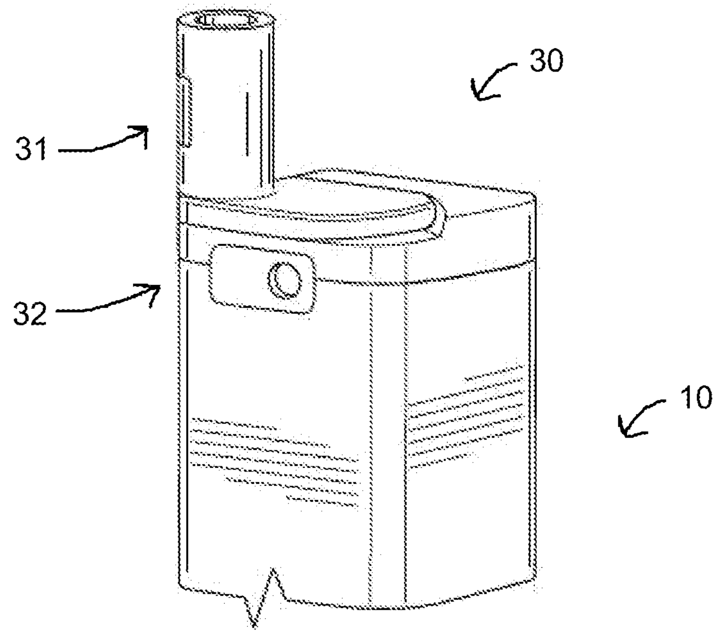
FIG. 5B is a front perspective view of a cap assembly of the embodiment shown in FIG. 1A.

Referring now to FIGS. 5A-5B, the leg assembly 10 may be coupled to the cap assembly 30. The cap assembly 30 may include a mounting section 31 and a port section 32. The port section 32 of the cap assembly 30 is discussed in greater detail further herein.

Figure 6:
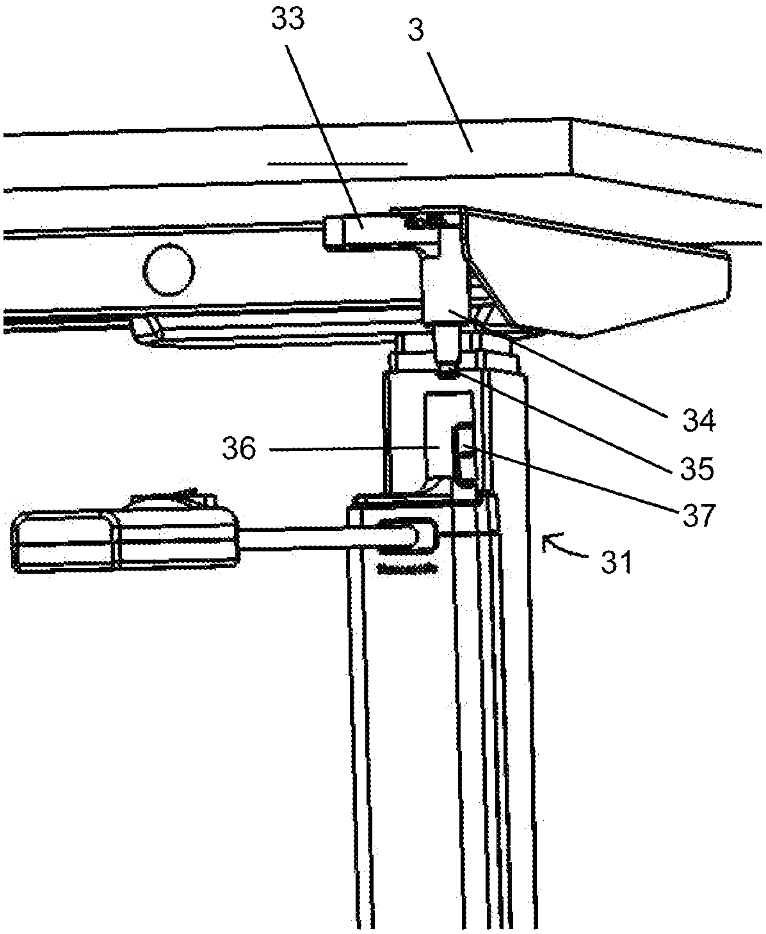
FIG. 6 is a front perspective view of the cap assembly shown in FIG. 5B in a disengaged position.
Figure 7:
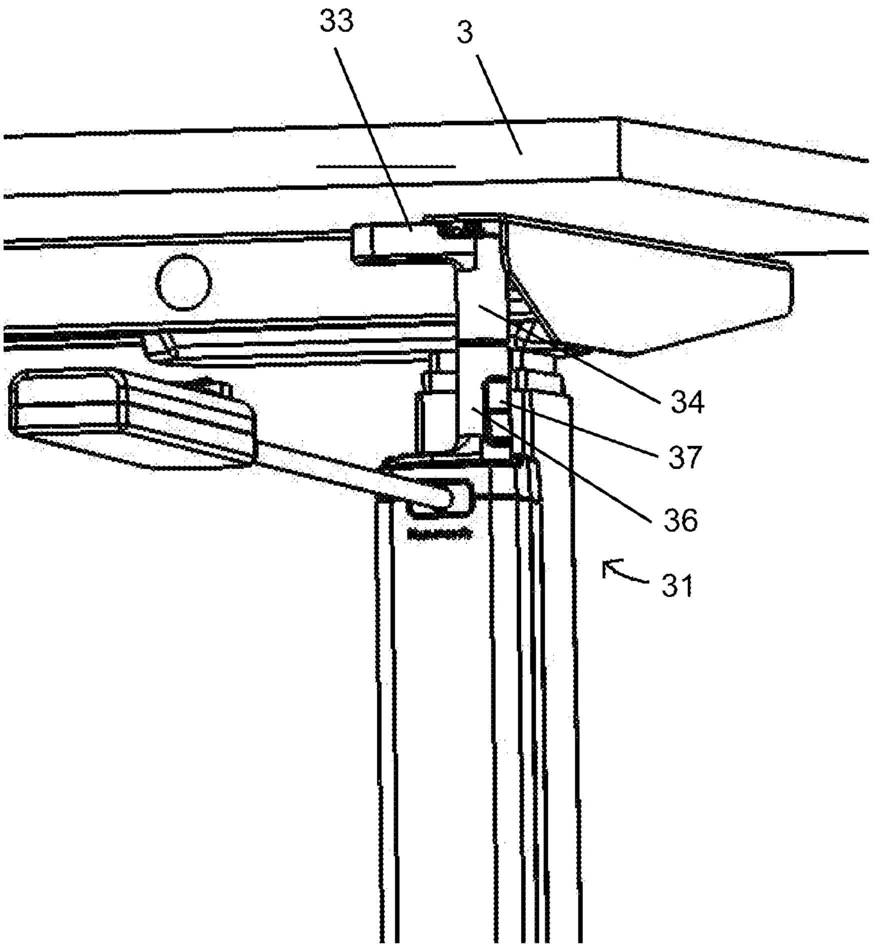
FIG. 7 is a front perspective view of the cap assembly shown in FIG. 5B in an engaged position.

As shown in FIGS. 6-7, the mounting section 31 may be releasably attached to the work surface 3. The mounting section 31 may include a mounting stem 34 and a releasable mounting socket 36. The mounting stem 34 may be coupled to a work surface 3 via a bracket 33. The bracket 33 may be attached to the work surface 3 via screws. The mounting stem 34 may be configured to attach the cable management apparatus 1 to the work surface 3 by engaging the releasable mounting socket 36. Once a user couples the mounting stem 34 to the work surface 3 via the bracket 33, the user can engage the releasable mounting socket 36 to the mounting stem 34 such that the upper end of the cable management apparatus 1 is attached to the work surface 3. The mounting socket 36 may rotate 360 degrees to enable the user to easily place the cable management apparatus 1 into the user's optimal position.

Figure 8:
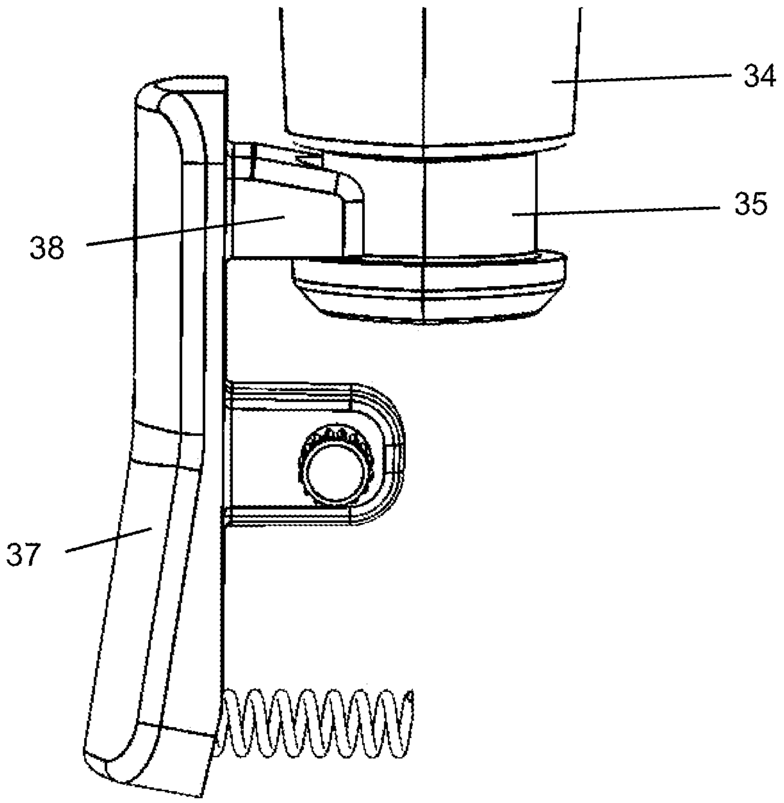
FIG. 8 is a side perspective view of a release catch button.

As depicted in FIG. 6, the mounting stem 34 may feature a ring indentation 35. The ring indentation 35 may allow the mounting stem 34 to connectively engage the releasable mounting socket 36. The releasable mounting socket 36 may include a release catch button 37 that connectively engages the ring indentation 35 and can be depressed to disengage the ring indentation 35. After the mounting stem 34 and the releasable mounting socket 36 are engaged (see FIG. 7), a user may push the release catch button 37 to disengage the releasable mounting socket 36 from the mounting stem 34 into a disengaged position (see FIG. 6). FIG. 8 illustrates the release catch button 37, which may include a mounting protrusion 38 that fits into the ring indentation 35. The release catch button 37 may further include a spring 39 configured to bias the contact between the mounting protrusion 38 of the release catch button 37 and the ring indentation 35 of the mounting stem 34.

Figure 9:
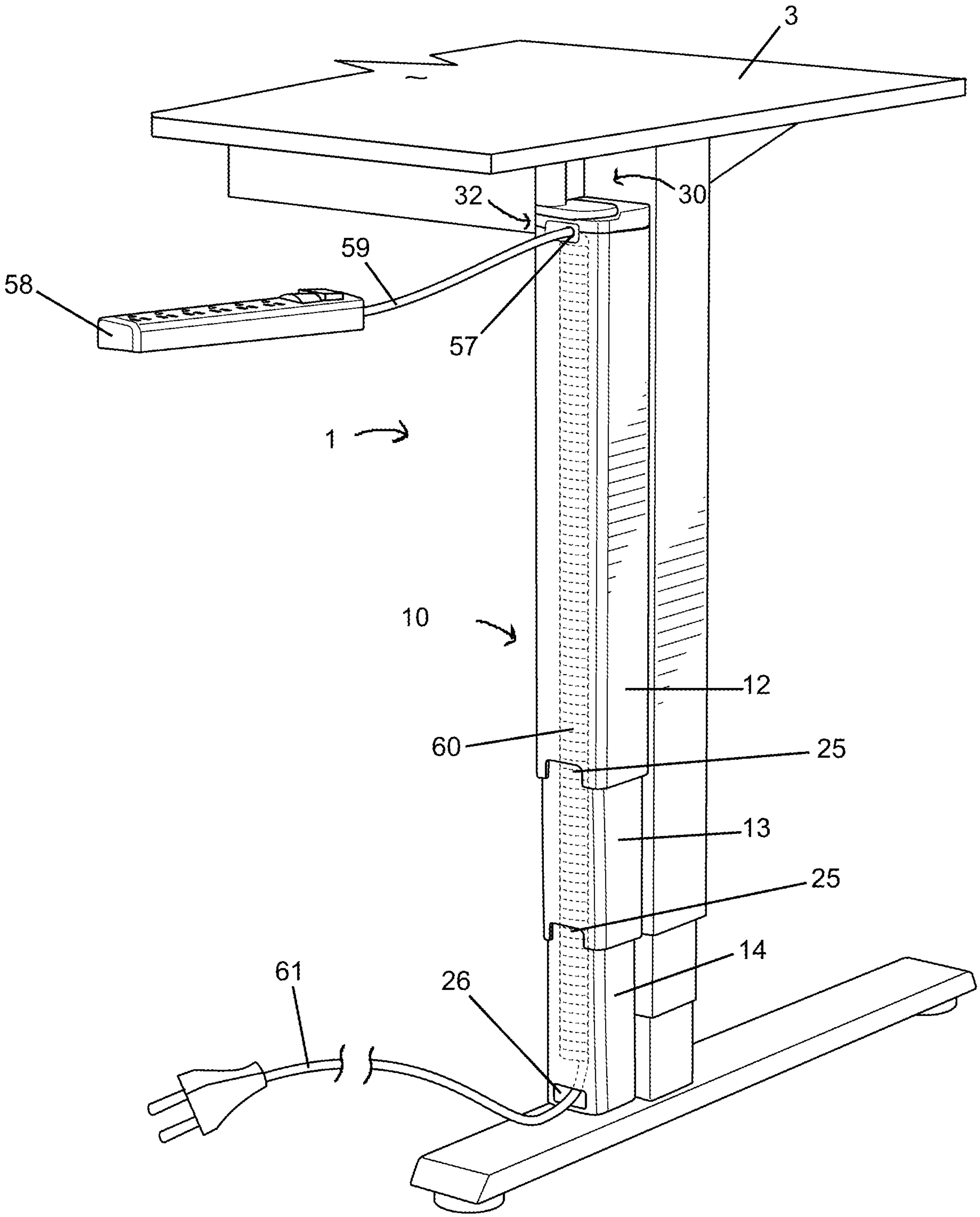
FIG. 9 is a front, partially transparent perspective view of the cable management apparatus shown in FIG. 1A.
Figure 10:
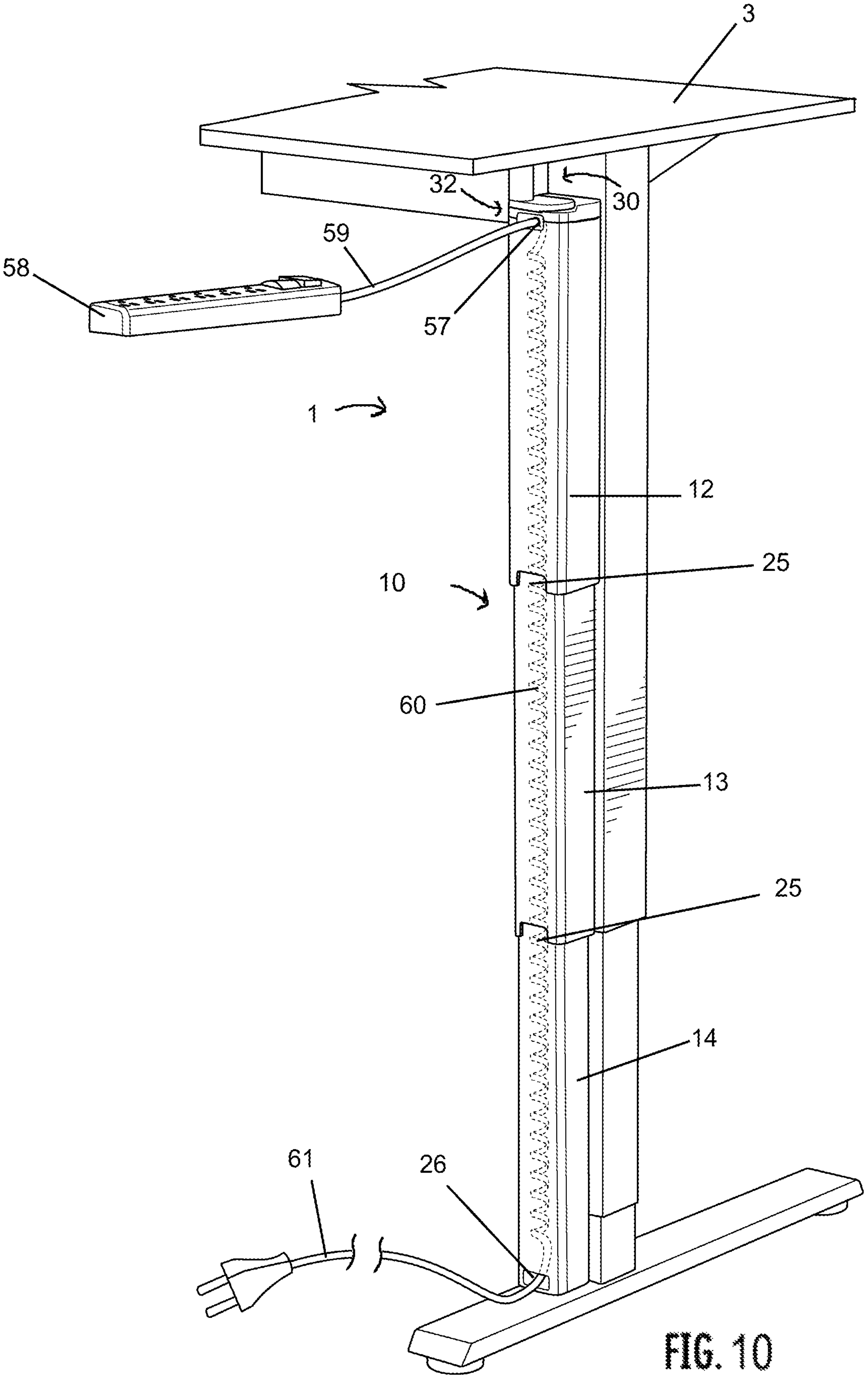
FIG. 10 is a front, partially transparent perspective view of the cable management apparatus shown in FIG. 1A in an extended position.

Referring now to FIGS. 9-10, the leg assembly 10 is coupled to the cap assembly 30, and the cap assembly 30 is coupled to the work surface 3. As previously discussed, the work surface 3 may be a variable height desk. When a user raises the work surface 3 to a higher position, the work surface 3 may then raise the cap assembly 30. When the cap assembly 30 is raised to a higher position by the work surface 3, the cap assembly 30 may raise the first telescoping segment 12 of the leg assembly 10. When the first telescoping segment 12 is raised to a higher position, the first telescoping segment 12 may engage the second telescoping segment 13 and begin to raise the second telescoping segment 13 to a higher position. When the user raises the work surface 3 to a higher position, the height of the cable management apparatus 1 is thus increased up to a maximum height, for example, of 1302 mm in the illustrated embodiment. FIG. 10 depicts the cable management apparatus 1 in an extended position.

When a user lowers the work surface 3 into a lower position, the length of the cable management apparatus 1 is decreased by lowering the cap assembly 30, which in turn lowers the first telescoping segment 12 of the leg assembly 10. When the first telescoping segment 12 is lowered, the first telescoping segment 12 may disengage the second telescoping segment 13 and begin to lower the second telescoping segment 13. When a user lowers the work surface 3, the height of the cable management apparatus 1 is thus decreased up to a minimum height, for example, of 482 mm in the illustrated embodiment. FIG. 2 depicts the cable management apparatus 1 in a partially contracted position.

Referring to the exemplary embodiment depicted in FIGS. 9-10, the port section 32 of the cap assembly 30 may comprise one or more upper cable apertures 57. The one or more upper cable apertures 57 may be configured to allow an upper end 59 of a power strip cord 58 to pass through and into the leg assembly 10. In alternative embodiments, the upper cable aperture 57 may be configured to allow any type of cord or cable to pass through and into the leg assembly 10. The leg assembly 10 may comprise a lower cable aperture 26. The lower cable aperture 26 may be positioned on the lower segment 14 such that a lower end 61 of the power strip cord 58 may pass through the lower cable aperture 26. Additionally, a middle portion 60 of the power strip cord 58 may be coiled such that when the cable management apparatus 1 extends, the middle portion 60 of the power strip cord 58 may also extend (see FIG. 10), and when the cable management apparatus 1 contracts, the middle portion 60 of the power strip cord 58 may also contract (see FIG. 9). The coiled middle portion 60 of the power strip cord 58 may be a spiraled, helical shape such that the middle portion 60 may stretch and contract without extending the length of the lower end 61 of the power strip cord 58 passing through the lower cable aperture 26. The telescoping segments (12, 13) may comprise one or more grooves 25 such that when the cable management system 1 is in a fully contracted position, the lower cable aperture 26 and the lower end 61 of the power strip cord 58 remain unobstructed by the telescoping segments (12, 13).

Referring back to FIG. 2, the port section 32 of the cap assembly 30 may comprise one or more upper data ports 47. A skilled artisan will realize that the one or more upper data ports 47 may take on a variety of forms. For example, the one or more upper data ports may take the form of a USB port, a USB-C port, an Ethernet port, an HDMI port, a DVI port, or a display port. In some embodiments, the one or more upper data ports may comprise one USB-C port. In alternative embodiments, the one or more upper data ports may comprise two Ethernet ports. In further alternative embodiments, the one or more upper data ports may comprise one USB port and one HDMI port. In the exemplary embodiment shown in FIGS. 4-5, the one or more upper data ports 47 may include one Ethernet port 48. The one or more upper data ports 47 of the cap assembly 30 may correspond to one or more lower data ports 49 of the leg assembly 10. For example, the one or more lower data ports 49 of the leg assembly 10 may include one Ethernet port 50.

Figure 11:
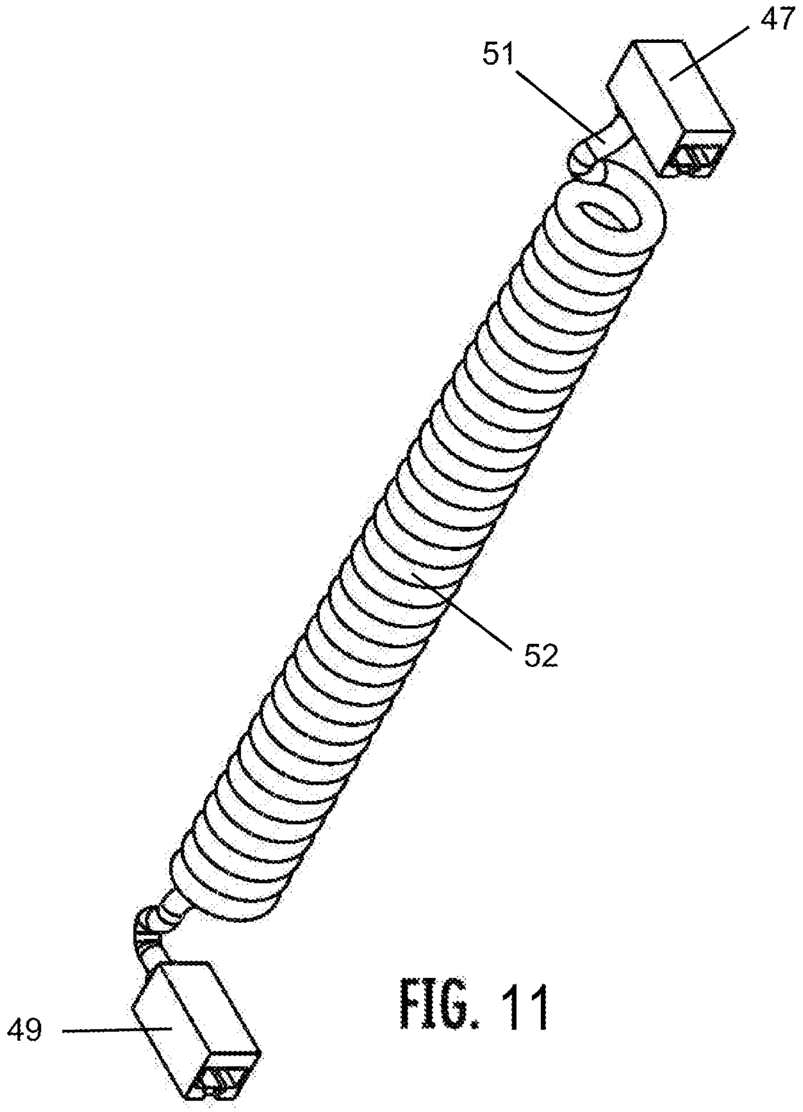
FIG. 11 is a front perspective view of a coiled data cable.

Referring now to FIG. 11, one or more data cables 51 may flow between the one or more upper data ports 47 of the cap assembly 30 and the one or more lower data ports 49 of the leg assembly 10. For example, a USB cable may be used in an embodiment including USB ports, and an Ethernet cable may be used in an embodiment including Ethernet ports. The one or more data cables 51 may comprise a middle coiled portion 52 such that when the cable management apparatus 1 is in the extended position, the one or more data cables 51 also extends, and when the cable management apparatus 1 is in the contracted position, the one or more data cables 51 also contracts. Referring back to FIG. 2, the telescoping segments (12, 13) may include the one or more grooves 25 such that when the cable management system 1 is in a fully contracted position, the one or more lower data ports 49 of the leg assembly 10 remain unobstructed by the telescoping segments (12, 13).

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A cable management apparatus adapted for use with height-adjustable tables, the cable management apparatus comprising:

a) a cap assembly, wherein the cap assembly comprises a first upper cable aperture, a mounting stem configured to releasably attach to a work surface, and a releasable mounting socket configured to connectively engage the mounting stem;

b) a height-adjustable leg assembly secured to the cap assembly, the height-adjustable leg assembly comprising: (i) a telescoping portion comprising two or more telescoping leg segments defining an internal cavity; and (ii) a foot subassembly connected to the telescoping portion, wherein the foot subassembly includes a first lower cable aperture; and c) a multi-outlet power distribution unit comprising: (i) a socket housing having a plurality of electrical sockets; and (ii) a main power cord coupled to the socket housing, wherein the main power cord has: an upper portion extending into the first upper cable aperture; a middle coiled portion positioned within the internal cavity of the height-adjustable leg assembly and configured to expand and contract in length; and a lower portion extending from the first lower cable aperture.

2. The cable management apparatus of claim 1, wherein the telescoping portion of the height-adjustable leg assembly is configured to increase or decrease a height of the cap assembly relative to the foot subassembly.

3. The cable management apparatus of claim 1, wherein the two or more telescoping leg segments comprise a groove configured to allow the first lower cable aperture to remain unobstructed by the two or more telescoping leg segments.

4. The cable management apparatus of claim 1, wherein the mounting stem comprises a ring indentation, wherein the releasable mounting socket is configured to engage the ring indentation.

5. The cable management apparatus of claim 4, wherein the cap assembly further comprises a release catch configured to disengage the releasable mounting socket from the mounting stem.

6. The cable management apparatus of claim 5, wherein the release catch comprises a push button configured to release the mounting stem upon depressing of the push button.

7. A cable management apparatus adapted for use with height-adjustable tables, the cable management apparatus comprising:

a) a cap assembly comprising: (i) a first upper cable aperture; (ii) one or more upper data ports, (iii) a mounting stem configured to releasably attach to a work surface; and (iv) a releasable mounting socket configured to connectively engage the mounting stem;

b) a height-adjustable leg assembly secured to the cap assembly, the height-adjustable leg assembly comprising: (i) a telescoping portion comprising two or more telescoping leg segments defining an internal cavity; and (ii) a foot subassembly connected to the telescoping portion, wherein the foot subassembly includes: a first lower cable aperture; and one or more lower data ports operatively connected to the one or more upper data ports; and c) a multi-outlet power distribution unit comprising: (i) a socket housing having a plurality of electrical sockets; and (ii) a main power cord coupled to the socket housing, wherein the main power cord has: an upper portion extending into the first upper cable aperture; a middle coiled portion positioned within the internal cavity of the height-adjustable leg assembly and configured to expand and contract in length; and a lower portion extending from the first lower cable aperture.

8. The cable management apparatus of claim 7, wherein the one or more upper data ports are chosen from the group consisting of a USB port, a USB-C port, an Ethernet port, an HDMI port, a DVI port, and a display port, wherein the one or more lower data ports corresponds to the one or more upper data ports.

9. The cable management apparatus of claim 8, wherein the cap assembly further comprises one or more coiled data cables for operatively connecting the one or more upper data ports to the one or more lower data ports.

10. The cable management apparatus of claim 9, wherein the one or more coiled data cables are configured to expand and contract upon lengthening and shortening of the height-adjustable leg assembly.

11. The cable management apparatus of claim 10, wherein the telescoping segments are configured to increase or decrease a height of the cap assembly relative to the one or more lower data ports.

12. The cable management apparatus of claim 11, wherein the two or more telescoping segments comprises a groove configured to allow the one or more lower data ports to remain unobstructed by the two or more telescoping segments.

13. The cable management apparatus of claim 7, wherein the mounting stem comprises a ring indentation, wherein the releasable mounting socket is configured to engage the ring indentation.

14. The cable management apparatus of claim 13, wherein the cap assembly further comprises a release catch configured to disengage the releasable mounting socket from the mounting stem.

15. The cable management apparatus of claim 14, wherein the release catch comprises a push button configured to release the mounting stem upon depressing of the push button.

16. A method of managing cables, the method comprising the steps of:

a) securing a cable management apparatus to a work surface, the cable management apparatus comprising: a cap assembly and a leg assembly; wherein the cap assembly comprises a mounting stem configured to releasably attach to a work surface, a releasable mounting socket configured to connectively engage the mounting stem, and one or more upper cable apertures; wherein the leg assembly comprises a lower segment, two or more telescoping segments positioned between the lower segment and the cap assembly, and one or more power strip cords, wherein the lower segment includes one or more lower cable apertures, wherein the one or more power strip cords passes through the one or more upper cable apertures and the one or more lower cable apertures; and b) adjusting a vertical height of the work surface and the cable management apparatus.

* * * * *